United States Patent
Lu et al.

(10) Patent No.: US 10,139,876 B2
(45) Date of Patent: Nov. 27, 2018

(54) EFFICIENT REBOOT OF AN OPERATING SYSTEM EXECUTED IN A VIRTUAL MACHINE

(71) Applicant: VMware, Inc., Palo Alto, CA (US)

(72) Inventors: Xunjia Lu, Saratoga, CA (US); Xavier Deguillard, Sunnyvale, CA (US); Mukund Gunti, Mountain View, CA (US); Vishnu Sekhar, Sunnyvale, CA (US)

(73) Assignee: VMware Inc., Palo Alto, CA (US)

( * ) Notice: Subject to any disclaimer, the term of this patent is extended or adjusted under 35 U.S.C. 154(b) by 122 days.

(21) Appl. No.: 15/191,444

(22) Filed: Jun. 23, 2016

(65) Prior Publication Data
US 2017/0371388 A1 Dec. 28, 2017

(51) Int. Cl.
| | | |
|---|---|---|
| *G06F 1/24* | (2006.01) | |
| *G06F 9/44* | (2018.01) | |
| *G06F 21/57* | (2013.01) | |
| *H04L 9/32* | (2006.01) | |
| *G06F 9/4401* | (2018.01) | |
| *G06F 1/32* | (2006.01) | |

(52) U.S. Cl.
CPC .............. *G06F 1/24* (2013.01); *G06F 1/3287* (2013.01); *G06F 9/4401* (2013.01); *G06F 9/4408* (2013.01); *G06F 21/575* (2013.01); *H04L 9/3242* (2013.01)

(58) Field of Classification Search
None
See application file for complete search history.

(56) References Cited

U.S. PATENT DOCUMENTS

| | | | | |
|---|---|---|---|---|
| 8,352,661 | B1* | 1/2013 | Sanville | H05K 7/1498 370/225 |
| 2007/0250691 | A1 | 10/2007 | Cool et al. | |
| 2008/0104608 | A1* | 5/2008 | Hyser | G06F 9/5027 718/105 |
| 2012/0131380 | A1 | 5/2012 | Horman et al. | |
| 2013/0151831 | A1* | 6/2013 | Bealkowski | G06F 9/45533 713/2 |
| 2014/0101653 | A1* | 4/2014 | Dharmadhikari | G06F 8/65 717/173 |

(Continued)

OTHER PUBLICATIONS

Vivek Goyal et al, Kdump, A Kexec-based Kernel Crash Dumping Mechanism, published 2005.

(Continued)

*Primary Examiner* — Kim Huynh
*Assistant Examiner* — Danny Chan
(74) *Attorney, Agent, or Firm* — Thomas | Horstemeyer, LLP

(57) ABSTRACT

A computer system is rebooted after updating a boot image without running platform firmware with its power-on self-test of system hardware devices and without retrieving all of the modules included in a boot image from an external source and reloading them into system memory. The reboot process includes the steps of loading one or more updated modules of the boot image into the system memory, executing the boot loader module to load for execution modules of the boot image including a system software kernel and the updated modules, and transferring execution control to the system software kernel.

20 Claims, 7 Drawing Sheets

(56) References Cited

U.S. PATENT DOCUMENTS

2014/0181575 A1    6/2014  Kalach et al.
2017/0329593 A1*  11/2017  McMullen ................ G06F 8/63

OTHER PUBLICATIONS

Andy Pfiffer, "Reducing System Reboot Time with kexec," Technical Report. Open Source Development Labs, Inc., Beaverton, OR (2003), pp. 1-10.

* cited by examiner

EFFICIENT REBOOT OF AN OPERATING SYSTEM EXECUTED IN A VIRTUAL MACHINE

CROSS-REFERENCE TO RELATED APPLICATION(S)

This application is related to U.S. patent application Ser. No. 15/191,438, entitled "Efficient Reboot of an Operating System" and filed Jun. 23, 2016.

BACKGROUND

Developing software, including operating systems as well as applications, is usually an iterative process of edit, compile, and test. A reboot is often required during software development, especially operating system development. The reboot may be needed when testing new modules of the software, or to recover from a crashed state during testing. Unfortunately, the reboot process can be time-consuming and may take well over tens of minutes to finish on some physical machines. This is undesirable as it slows down and essentially stalls the software development pipeline.

SUMMARY

One or more embodiments provide a technique to reboot a computer system such as a server without running platform firmware, thus avoiding an included power on self-test of its hardware devices, and without retrieving an entire boot image from an external source and reloading them into memory.

A method for rebooting system software for a computer system after updating a boot image, according to an embodiment, includes reloading a boot loader module for the system software into system memory, shutting down all processing units of the computer system, except a selected one to be used for rebooting, and executing the reboot operation on the selected processing unit to reboot the system software. The reboot operation does not run platform firmware thus avoiding at least a power-on self-test of hardware devices of the computer system. The reboot operation further includes the steps of loading one or more updated modules of the boot image into the system memory, executing the boot loader module to load for execution modules of the boot image including a system software kernel and the updated modules, and transferring execution control to the system software kernel.

Further embodiments of the present invention include, without limitation, a non-transitory computer-readable storage medium that includes instructions for a processor to carry out the above method, and a computer system that includes a processor programmed to carry out the above method.

DETAILED DESCRIPTION

Figure 1:
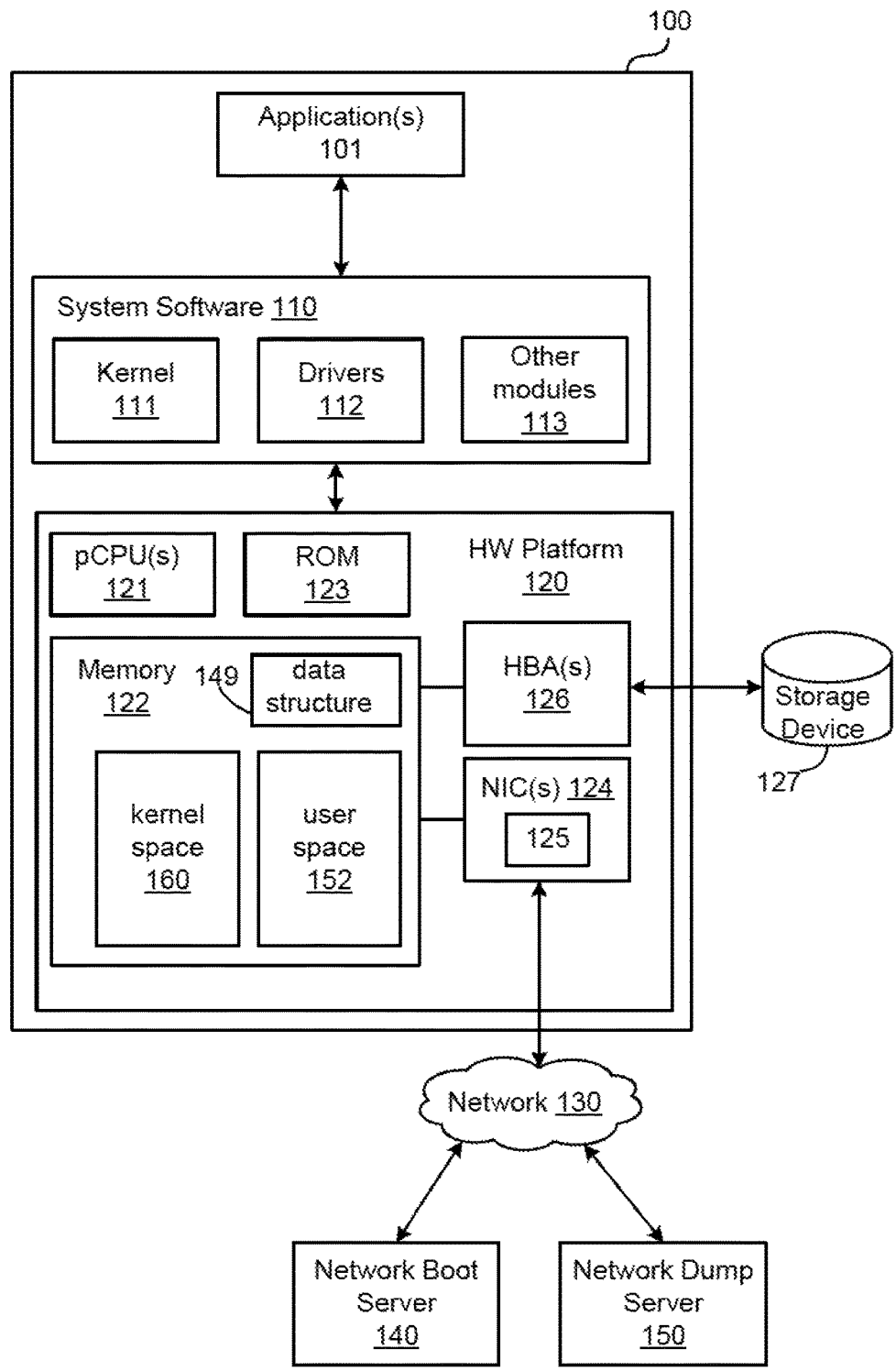
FIG. 1 depicts a block diagram of a computer system in which one or more embodiments may be implemented.

FIG. 1 is a block diagram of a computer system 100 in which one or more embodiments of the present invention may be implemented. The computer system 100 includes one or more applications 101 that are running on top of the system software 110. The system software 110 includes a kernel 111, drivers 112 and other modules 113 that manage hardware resources provided by a hardware platform 120. In one embodiment, the system software 110 is an operating system (OS), such as operating systems that are commercially available. In another embodiment, system software 110 is a hypervisor that supports virtual machine applications running thereon, e.g., a hypervisor that is included as a component of VMware's vSphere® product, which is commercially available from VMware, Inc. of Palo Alto, Calif. The hardware platform 120 includes one or more physical central processing units (pCPUs) 121, system memory 122 (e.g., dynamic random access memory (DRAM)), read-only-memory (ROM) 123, one or more network interface cards (NICs) 124 that connect the computer system 100 to a network 130, and one or more host bus adapters (HBAs) 126 that connect to storage device(s) 127, which may be a local storage device or provided on a storage area network. The system memory 122 has a user space 152 that contains a number of modules (depicted in FIG. 4), a data structure 149, and a kernel space 160, all of which are further described below. In the descriptions that follow, a pCPU denotes either a processor core, or a logical processor of a multi-threaded physical processor or processor core if multi-threading is enabled. Each NIC 124 includes a non-volatile memory section 125 that stores the firmware for the device. In the embodiments described herein, the firmware for NIC 124 includes UNDI (Universal Network Device Interface) application programming interfaces (APIs). UNDI APIs provide a device-agnostic way to gain network access without the use of any drivers, and are used for network access during a network boot process prior to loading of the NIC drivers. According to one or more embodiments of the present invention, UNDI APIs are preserved in the system memory 122 post-boot and are used for network access during a network core dump process.

The computer system 100 depicted in FIG. 1 is booted from the network in accordance with the platform firmware stored in ROM 123. Hereinafter, platform firmware includes a basic input/output operating system (BIOS) or firmware meeting the unified extensible firmware interface (UEFI) or other similar firmware. Platform firmware may but is not required to carry out some or all of the functions of initializing and testing the various hardware devices, RAM, interrupts, DMA, chipsets, and PCI devices and controllers for correct operation. It should be recognized that the present invention is not limited to booting from the network and may be booted from the storage device 127.

Figure 2:
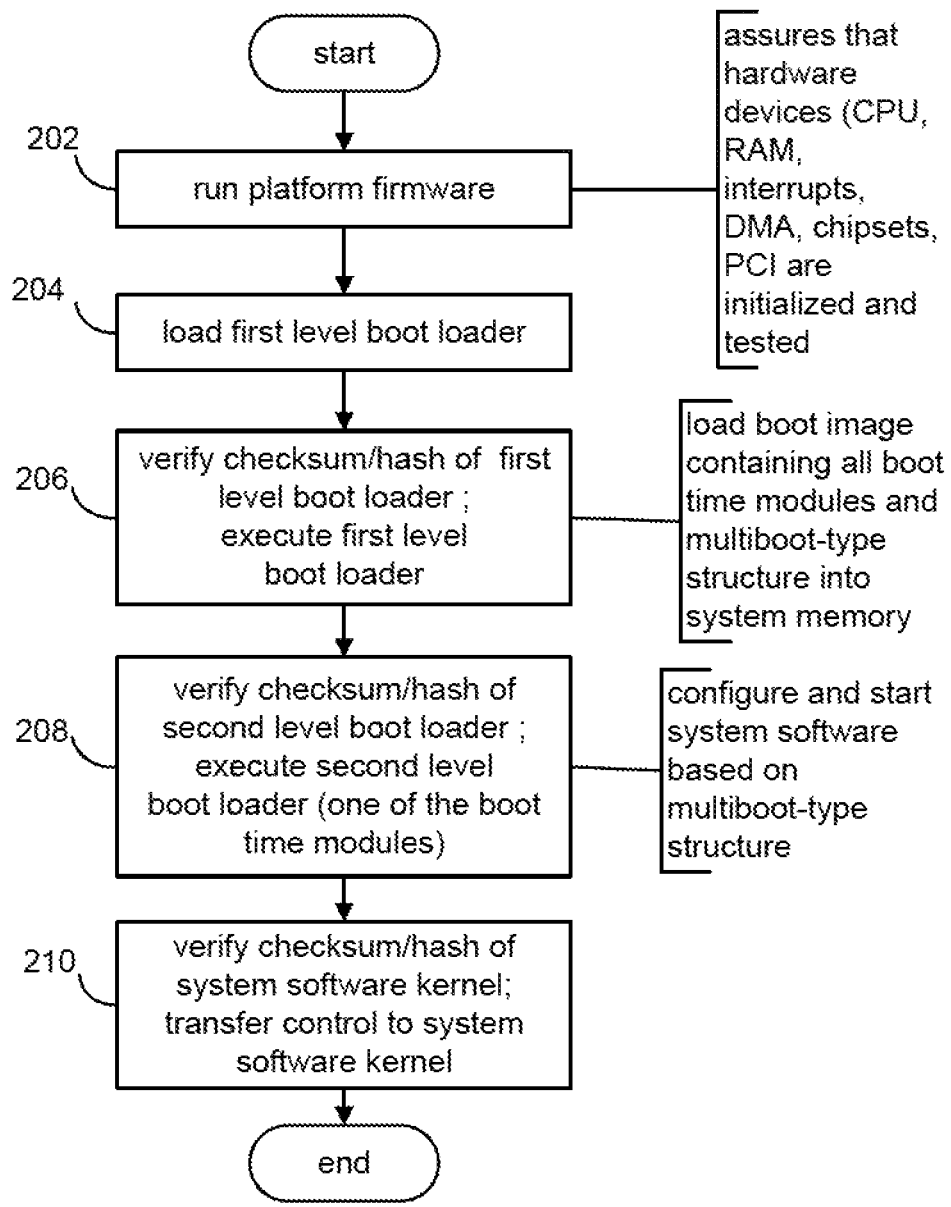
FIG. 2 depicts a flow diagram of a conventional process for booting a computer system.

The normal boot process involves the steps depicted in FIG. 2. In step 202, the system runs platform firmware. The platform firmware, depending on the hardware vendor, usually includes a power-on self-test (POST), which checks the hardware devices of the computer system 100 to assure that for the next steps the hardware devices are in working order and properly initialized. In step 204, the platform firmware loads a first level boot loader into memory, and in step 206, upon verifying the checksum or hash of the first level boot loader, the first level boot loader is given control. The job of the first level boot loader is to set up a data structure 149, such as the structure illustrated in FIG. 3, for a second level boot loader, and to load into the system memory 122 all of the modules contained in the boot image 400 (also referred to herein as the "boot-time modules"), which are depicted in FIG. 4. Common first level boot loaders for performing step 206 are PXELINUX and SYSLINUX, though any first level boot loader will work. If the first level boot loader is PXELINUX, the first level boot loader and the boot image 400 are retrieved over the network. If the first level boot loader is SYSLINUX, the first level boot loader and the boot image 400 are retrieved from the storage device 127.

Figure 3:
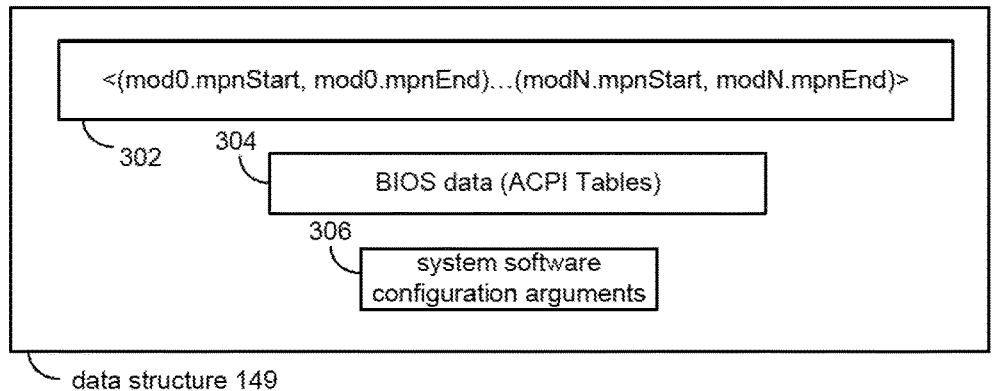
FIG. 3 depicts an example data structure employed by a boot loader according to embodiments.
Figure 4:
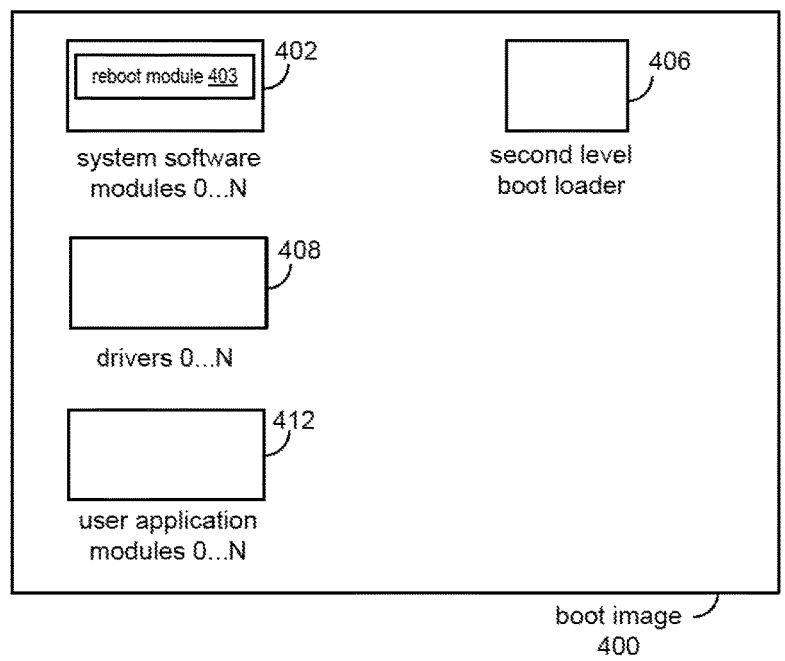
FIG. 4 depicts an example set of modules included in a boot image that is loaded into system memory during a boot process.

The data structure 149, as shown in FIG. 3, contains a list of start and end addresses 302 in kernel space 160 of each module in the boot image 400, BIOS data 304 including the Advanced Configuration and Power Interface (ACPI) tables (i.e., hardware configuration tables), and configuration arguments 306 for the system software 110. In one embodiment, the data structure conforms to the structure specified in the open standard Multiboot Specification. The modules of the boot image 400 to be loaded into the kernel space 160 include the second level boot module 406, system software modules 402, which include the system software kernel and a reboot module 403, in one embodiment, that is invoked to reboot the computer system 100 in accordance with embodiments, driver modules 408, and user application modules 412. In other embodiments, instead of having a separate reboot module, the reboot functionality can be included in the system software kernel itself. Each module in the boot image 400 is designed not to depend on any other module so that a module can be replaced without affecting any other module. In one embodiment, the data structure 149 includes a linked list in which a list entry specifies a module using a 64-bit machine page number (MPN). In such an embodiment, the modules 402, 406, 408, 412 can be located in higher regions (greater than 4 GB) of memory and these modules need not be stored contiguously in the system memory 122.

Referring back to FIG. 2, in step 206, the first level boot loader is executed to load all of the boot-time modules, including the second level boot loader 406, into the user space 152 of the system memory 122. In step 208, upon verifying the checksum or hash of the second level boot loader 406, the second level boot loader 406 is executed. The job of the second level boot loader 406 is to locate the boot-time modules in the user space 152, copy them into the kernel space 160 using the data structure 149 (from which locations they can be accessed for execution), and to complete the booting process by verifying the checksum or hash of the system software kernel and transferring control to the system software kernel in step 210.

The execution time for the steps in FIG. 2 can be as long as several minutes (tens of minutes) for some hardware platforms, and about half of the time is spent by the platform firmware running POST. Another significant portion of time is spent in retrieving the boot image 400. Embodiments provide a more efficient reboot process by not running platform firmware and by retrieving only a small portion of the boot image 400. In general, running platform firmware is not necessary upon reboot unless there is a hardware error. This means that, during software testing or software development, platform firmware with its POST check is typically not necessary, because during software testing or development the reason for the reboot is often not a hardware error. The entire boot image 400 need not be retrieved because a previous version is already available in the user space 152. Thus, to perform a reboot, embodiments perform the steps depicted in FIG. 5 in lieu of the steps depicted in FIG. 2.

Figure 5:
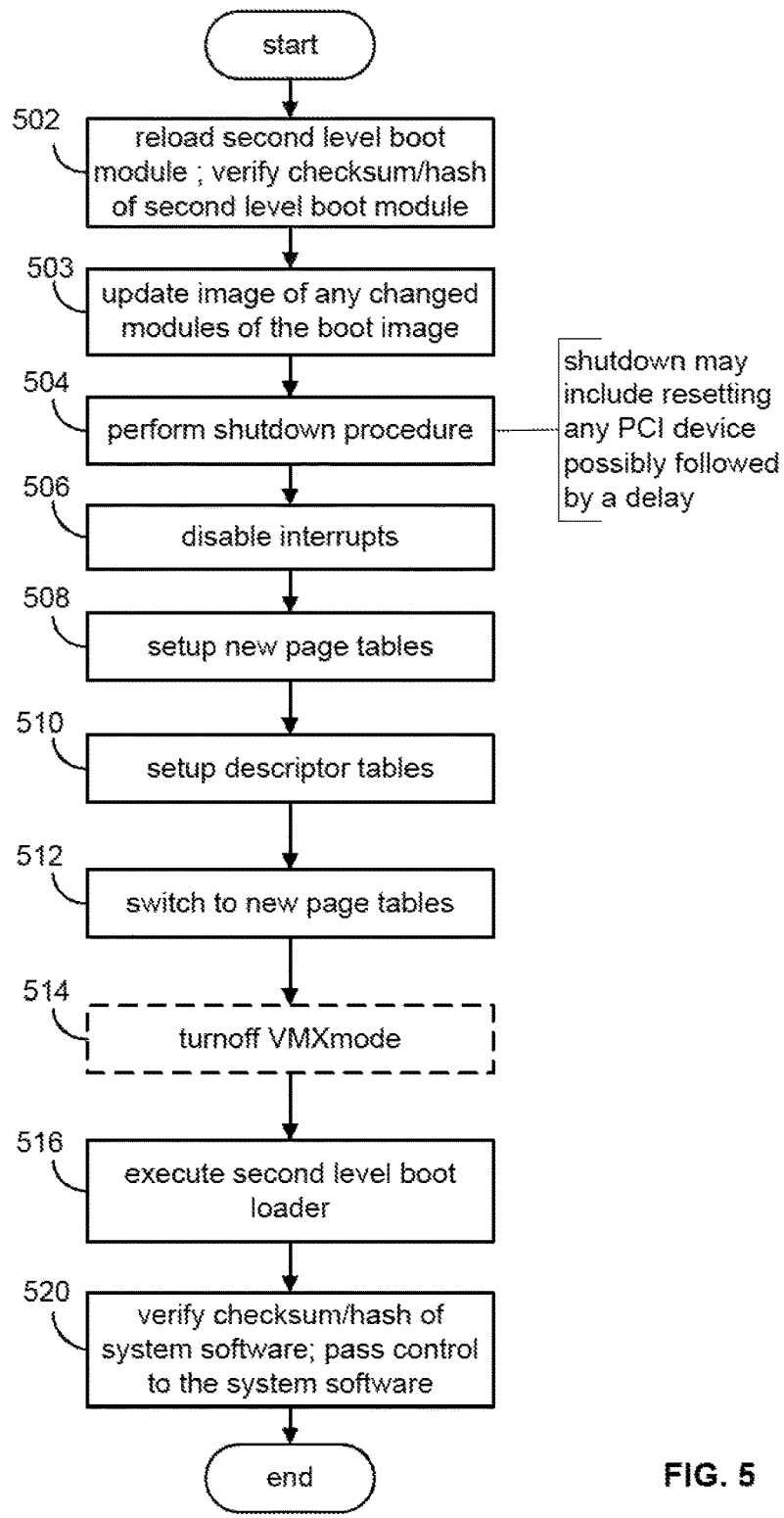
FIG. 5 depicts a flow diagram for booting a computer system in accordance with an embodiment.

To ensure that the steps depicted in FIG. 5 will be completed successfully, certain preparations are made. First, all of the boot-time modules in the kernel space 160 of the system memory 122 are made accessible during the reboot. Therefore, in the first cold boot, i.e., a boot after power is turned on, any module relocation is disabled so that the boot-time modules remain accessible during the reboot. In one embodiment, the accessible memory is the lowest 4 GB memory space of the system memory 122, which is the memory addressable by a 32-bit address, and the boot-time modules reside in the lowest 4 GB of main memory. Second, a metadata structure, e.g., the data structure 149, which provides information regarding the location of all of the boot-time modules is made accessible. In one embodiment, the data structure 149 is maintained in the lowest 4 GB memory space of the system memory 122. Third, the second level boot loader is maintained at a fixed address in the 4 GB memory space of the system memory 122. This allows a fresh copy of the second boot loader to be retrieved from an external source upon reboot.

With the above preparations, the reboot module (e.g., the reboot module 403) executes the steps depicted in FIG. 5 to reboot the computer system 100. In step 502, the reboot module reloads a fresh copy of the second level boot loader 406 into the system memory 122 at the fixed address in the 4 GB memory space of the system memory 122 according to the data structure 149 and verifies its checksum or hash. A fresh copy of the second level boot loader 406 is obtained because the existing copy of the second level boot loader 406 has a data section with variables whose values were changed during execution of the boot loader. In step 503, if an offline update has been made to one or more modules of the boot image 400 since the last boot, an image of such updated module is loaded into the kernel space 160 of the system memory 122. In one embodiment, the reboot module executes the steps of FIG. 6 (described below) to load the images of any such updated modules. In step 504, the reboot module carries out a computer system shutdown procedure to stop all of the devices as well as pending system services. This requires that each PCI device be reset possibly followed by a delay and that all pCPUs, except one of the pCPUs, be shut down. In step 506, the reboot module disables interrupts so that any pending operations are ignored and no interrupt service routines are entered. This avoids unexpected interrupts until the interrupt descriptor table (IDT) is setup to handle interrupts that are encountered in the later steps. All interrupts including legacy interrupts and MSI and MSIX are disabled. In step 508, the reboot module sets up new page tables to map the second level boot loader, the currently running code, and the address space for the data structure 149. In step 510, the reboot module sets up the descriptor tables.

In the embodiments where the pCPUs are x86-type processors, the local descriptor table (LDT), the global descriptor table (GDT), the task state segment (TSS), and the IDT, are setup. The IDT is setup to a basic IDT configuration to properly handle interrupts during the boot and execution of the second level boot loader. The LDT and GDT are setup to properly describe access to memory segments so that faults are avoided in the following steps.

In step 512, the reboot module makes the new page tables effective by programming the per-pCPU CR3 registers with the page table root. An optional step 514, in which the reboot module turns off the virtual machine (VM) mode, is executed in embodiments where system software 110 is a hypervisor that supports execution of VMs. In step 516, the reboot module invokes the second level boot loader 406 to load the system software kernel and the other modules from the kernel space 160 of the system memory 122 using a pCPU which is designated to be the bootstrap pCPU, according to the ACPI tables 304. Then, in step 520, the reboot module verifies the checksum or hash of the system software kernel and transfers execution control to the system software kernel.

Thus, the flow depicted in FIG. 5 up to step 516 in effect restores the computer system 100 to a state that is similar to that after step 206 in FIG. 2 so that the rebooting can occur without running platform firmware with its POST, and without retrieving the entire boot image 400.

A number of advantages arise from the ability to reboot in accordance with the flow depicted in FIG. 5. First, there are no more platform firmware delays including POST delays, thus reducing the reboot time by many minutes. Second, the time to retrieve all of the boot-time modules from the network 130 or the storage device 127 is saved. Third, a fully functional network stack can be used to load a boot-time module, in situations where the boot-time module is corrupted or a new boot-time module is to be tested upon reboot, instead of just the minimal network stack in the platform firmware or the firmware 125 for the NIC 124.

Figure 6:
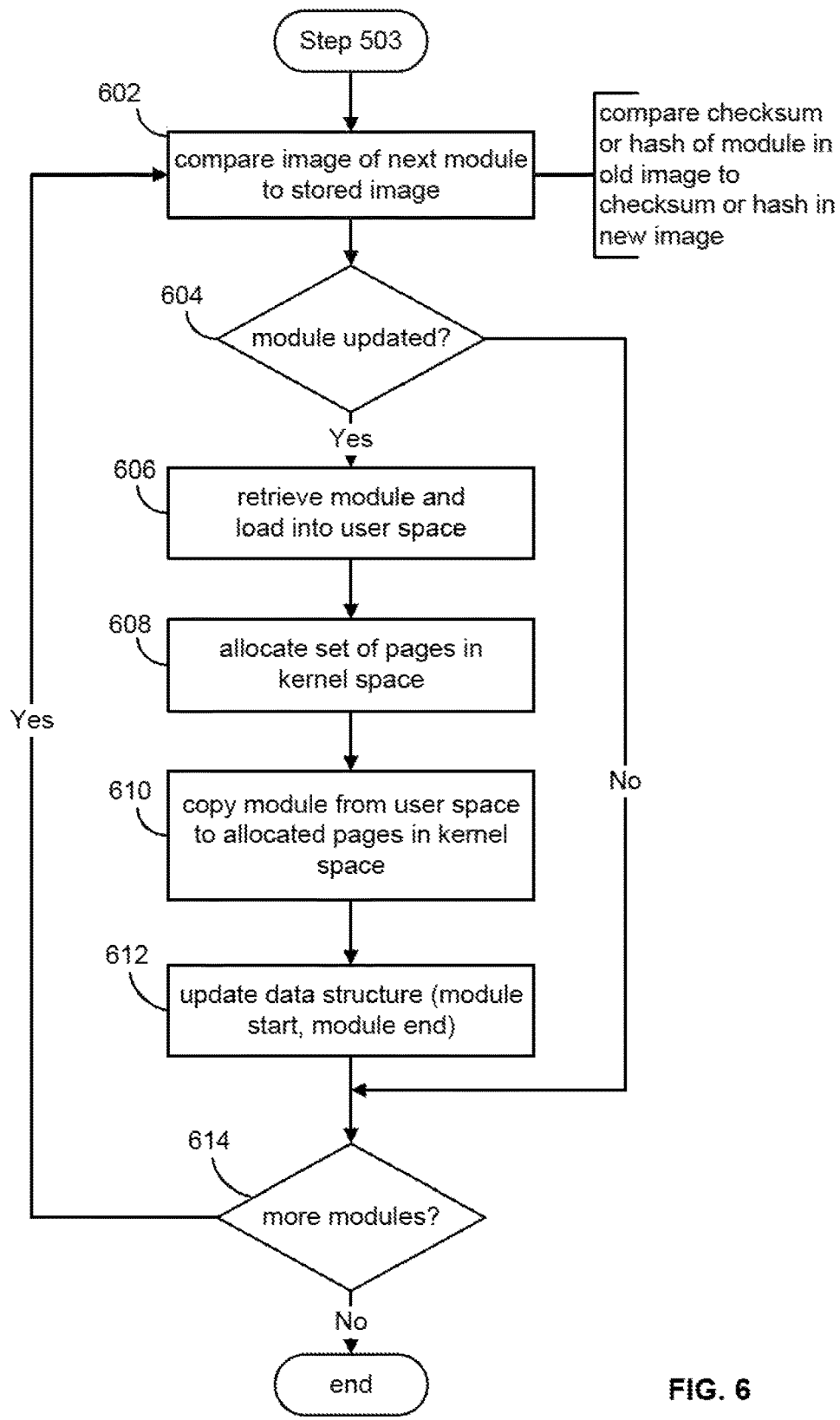
FIG. 6 depicts a flow diagram for selectively loading updated modules during the booting of a computer system in accordance with another embodiment.

FIG. 6 depicts a detailed flow diagram of step 503. In step 602, the reboot module a selects the next boot-time module and performs a check in step 604 to determine whether it has been updated. To make the determination, the reboot module compares a checksum or hash of the selected boot-time module that is currently stored in the user space 160 against a checksum or hash of the corresponding boot-time module in an updated boot image. In some embodiments, the boot image contains a digital signature of the boot-time modules in addition to their checksum or hash, and in step 604 the digital signature of the boot-time module is verified in addition to or in lieu of the checksum or hash verifications. If the selected boot-time module has been updated, as determined in step 604, the reboot module retrieves and loads, in step 606, the updated boot-time module into the user space 152. In step 608, the reboot module allocates a number of memory pages in the kernel space 160. In step 610, the reboot module copies the updated module into the allocated pages, and in step 612, the reboot module locates and updates the entry for the updated module in the data structure 149 to reflect the starting and ending locations of the updated module. In one embodiment, the reboot module computes the ending location of the module from the start of the module and the size of the module.

An additional number of advantages arise from the ability to selectively reload modules in the reboot operation. First, as mentioned above, updates to modules other than the kernel module itself can be tested. Second, with the availability of a full TCP/IP stack, multiple updated modules can be loaded in parallel and more efficiently so that the time for loading a large set of modules is greatly improved. Third, developer productivity is greatly improved because new modules can be loaded and tested very quickly. Fourth, many more regression tests can be run in a given period of time without more capital investment in testing. Fifth, an upgrade of computer systems to new releases of the operating system is possible without reloading all of the boot-time modules.

Figure 7:
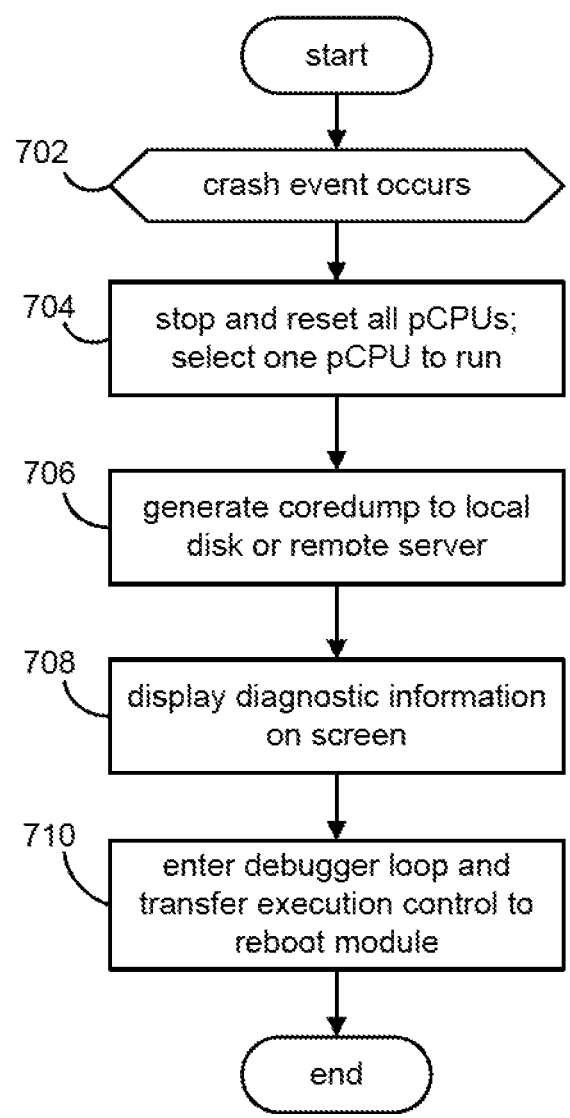
FIG. 7 depicts a flow diagram in which a panic event is handled.
Figure 8:
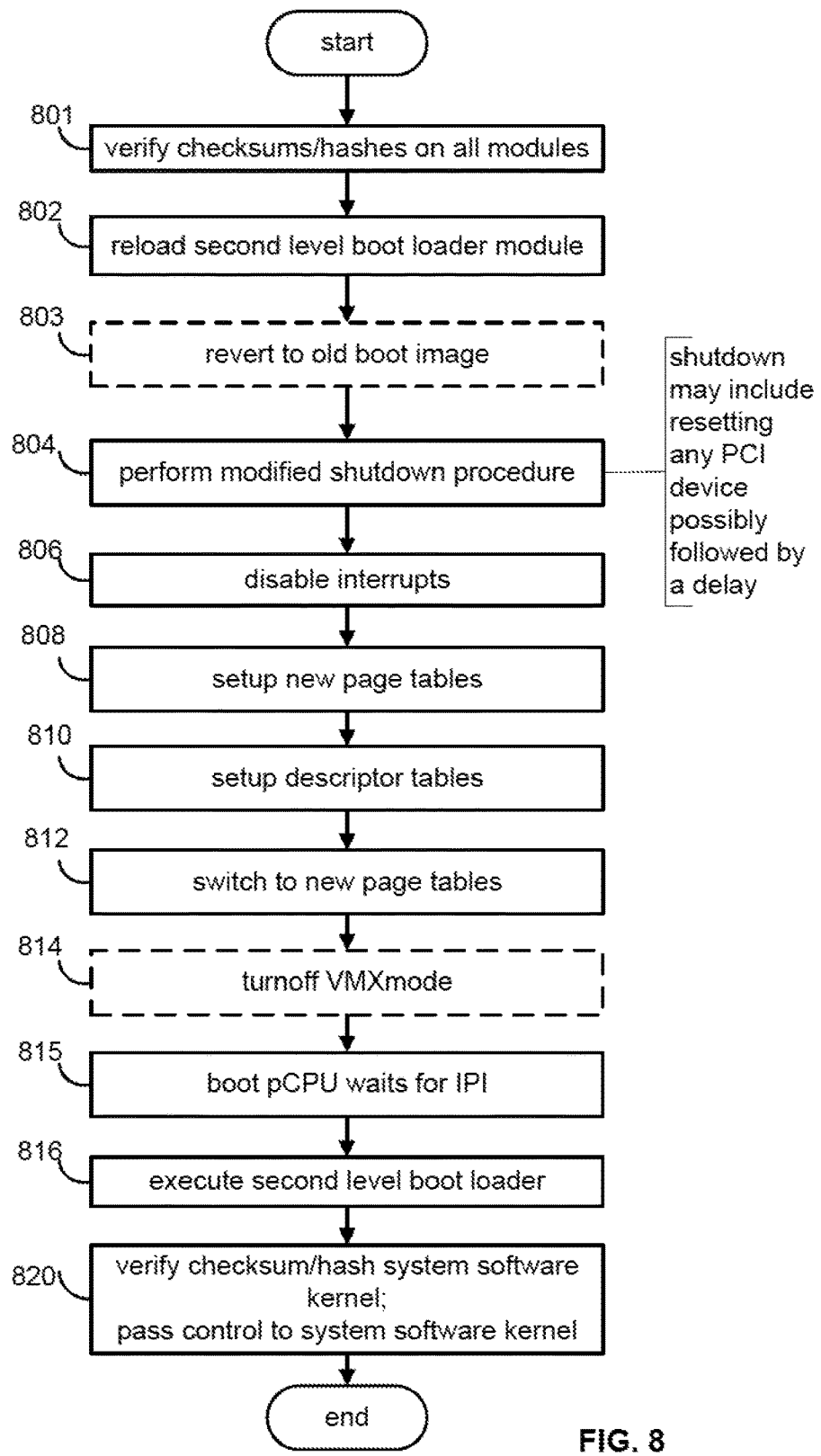
FIG. 8 depicts a flow diagram for rebooting a computer system in accordance with another embodiment.

According to embodiments, when a crash occurs during development, the process depicted in FIG. 7 is carried out for handling of the crash, and the process depicted in FIG. 8 is carried out to reboot from a crash.

In step 702, a crash event occurs. In step 704, a panic function in the system software 110 stops all of the pCPUs except for the one that detected the crash event. In step 706, the panic function generates a core dump to the storage device 127 or a remote core dump server 150. In step 708, the panic function displays a diagnostic screen with diagnostic information such as a backtrace to the crash and processor registers, and in step 710, the panic function enters a debug loop. To allow for a reboot after a crash, a command is added in the debug console function to pass execution control to the reboot module 403.

Referring to FIG. 8, the reboot module (e.g., the reboot module 403) verifies in step 801 the checksum or hash of each module of the boot image 140 stored in the kernel space 152 of the system memory 122 against its stored checksum or hash. This step assures that none of the boot-time modules is corrupted due to the crash. Any module that cannot be verified is reloaded from the user space 152 to the kernel space 160 and the data structure 149 is updated accordingly. In some embodiments, the boot image 140 contains a digital signature of the boot-time modules in addition to their checksum or hash, and in step 801 the digital signature of the boot-time module is verified in addition to or in lieu of the checksum or hash verifications. In step 802, the reboot module reloads the second level boot loader 406 for the same reason as noted above for step 502. Step 803 is an optional step that is executed to revert to an old version of the boot image that is known to be safe, i.e., does not cause a crash. Details of step 803 are similar to the details of step 503 depicted in FIG. 6, where the reboot module compares each boot-time module against the corresponding modules of the old version of the boot image and selectively loads the modules of the old version.

In step 804, the reboot module performs a modified shutdown procedure in which the code in the reboot module iterates over all of the PCI device controllers with a RST# signal to reset each device to its default state, possibly followed by a delay. Step 804 helps to avoid a recursive panic and the use of a corrupted networking or storage stack. Steps 806, 808, 810 and 812 are the same as the corresponding steps in FIG. 5, and step 814 is optional. In step 815, the reboot module, which is executing on the pCPU that detected the crash, causes an inter-processor interrupt (IPI) to be sent to the first pCPU (the bootstrap pCPU), which is waiting for an interrupt event. In step 816, upon receiving the IPI message, the bootstrap pCPU takes over the execution flow and executes the second level boot loader to load the system software kernel and the other modules from the kernel space 160 of the system memory 122. In step 820, upon verification of the checksum or hash of the system software kernel, the second level boot loader hands control over to the system software kernel. It should be recognized that the method of FIG. 8 describes the case where the pCPU that detected the crash is not the same as the bootstrap pCPU. In the case where the bootstrap pCPU is the pCPU that detected the crash, the IPI is not sent and received. Furthermore, in some embodiments, the IPI is sent to and received by any pCPU and that pCPU executes the second level boot loader to load the system software kernel and the other modules from the kernel space 160 of the system memory 122. Also, in another embodiment, the IPI is omitted altogether and the pCPU that detected the crash executes the second level boot loader to load the system software kernel and the other modules from the kernel space 160 of the system memory 122.

Embodiments may be applied to secure booting. After a crash, there are no absolute guarantees on the state of the system. There could have been memory corruptions. As a result, the code used for validating the checksums/hashes/signatures cannot be completely trusted. However, there exist hardware/CPU instructions that can measure the checksum/hash/signature of the first level boot loader and record it for inspection at a later point in time. This will guarantee the integrity of the first level boot loader that runs after the crash.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for rebooting system software for a computer system after updating a boot image, the method comprising:
   reloading a second level boot loader of a boot image module for the system software into system memory, the second level boot loader configured to at least locate a boot-time module in a user space, copy boot-time module into a kernel space, verify a checksum or hash of a system software kernel and transfer control to the system software kernel;
   shutting down all processing units of the computer system, except a selected one to be used for rebooting; and
   executing the reboot operation on the selected processing unit to reboot the system software, wherein the reboot operation does not run platform firmware of the computer system and includes the steps of:
      loading one or more updated modules of the boot image into the system memory;
      executing the second level boot loader to load execution modules of the boot image including the system software kernel and the updated modules; and
      transferring execution control to the system software kernel.

2. The method of claim 1, wherein the boot image is retrieved from an external source, and wherein the entire boot image is not reloaded into the system memory between start and completion of the reboot.

3. The method of claim 1, wherein the reboot operation further includes the step of:
   after the updated modules of the boot image are loaded into the system memory, updating a data structure that tracks locations of the modules within the system memory to store new locations of the updated modules within the system memory,
   wherein the second level boot loader accesses the data structure to locate the modules of the boot image during loading the modules of the boot image for execution.

4. The method of claim 3, wherein the reboot operation further includes the step of:
   determining whether or not a module of the boot image has changed by comparing a hash or checksum of the module with a hash or checksum respectively of the corresponding module in the updated boot image.

5. The method of claim 3, wherein the data structure contains an entry for each module of the boot image, the entry including a size, a start address and an end address for the module.

6. The method of claim 1, further comprising:
prior to executing the reboot operation, shutting down any pending I/O operations.

7. The method of claim 6, wherein shutting down any pending I/O operations includes:
resetting all I/O device controllers to their default state.

8. The method of claim 1, wherein the system software is an operating system or a hypervisor.

9. A non-transitory computer readable medium comprising instruction for causing a computer system to carry out a method for rebooting system software for a computer system after updating a boot image, the method comprising:
reloading a second level boot loader of a boot loader module for the system software into system memory, the second level boot loader configured to at least locate a boot-time module in a user space, copy boot-time module into a kernel space, verify a checksum or hash of a system software kernel and transfer control to the system software kernel;
shutting down all processing units of the computer system, except a selected one to be used for rebooting; and
executing the reboot operation on the selected processing unit to reboot the system software, wherein the reboot operation does not run platform firmware of the computer system and includes the steps of:
loading one or more updated modules of the boot image into the system memory;
executing the second level boot loader to load executing modules of the boot image including the system software kernel and the updated modules; and
transferring execution control to the system software kernel.

10. The non-transitory computer readable medium of claim 9, wherein the boot image is retrieved from an external source, and wherein the entire boot image is not reloaded into the system memory between start and completion of the reboot.

11. The non-transitory computer readable medium of claim 9, wherein the reboot operation further includes the step of:
after the updated modules of the boot image are loaded into the system memory, updating a data structure that tracks locations of the modules within the system memory to store new locations of the updated modules within the system memory,
wherein the second level boot loader accesses the data structure to locate the modules of the boot image during loading the modules of the boot image for execution.

12. The non-transitory computer readable medium of claim 11, wherein the reboot operation further includes the step of:
determining whether or not a module of the boot image has changed by comparing a hash or checksum of the module with a hash or checksum respectively of the corresponding module in the updated boot image.

13. The non-transitory computer readable medium of claim 11, wherein the data structure contains an entry for each module of the boot image, the entry including a size, a start address and an end address for the module.

14. The non-transitory computer readable medium of claim 9, wherein the method further comprises:
prior to executing the reboot operation, shutting down any pending I/O operations.

15. The non-transitory computer readable medium of claim 14, wherein shutting down any pending I/O operations includes:
resetting all I/O device controllers to their default state.

16. The method of claim 9, wherein the system software is an operating system or a hypervisor.

17. A computer system comprising:
a system memory containing a boot image that includes system software modules that were loaded during booting of system software, and a boot loader for the system software; and
one or more processing units, wherein at least one processing unit is configured to carry out a method for rebooting system software for a computer system after updating a boot image, the method comprising:
reloading a second level boot loader of a boot loader module for the system software into system memory, the second level boot loader configured to at least locate a boot-time module in a user space, copy boot-time module into a kernel space, verify a checksum or hash of a system software kernel and transfer control to the system software kernel;
shutting down all processing units of the computer system, except a selected one to be used for rebooting; and
executing the reboot operation on the selected processing unit to reboot the system software, wherein the reboot operation does not run platform firmware of the computer system and includes the steps of:
loading one or more updated modules of the boot image into the system memory;
executing the second level boot loader to load executing modules of the boot image including the system software kernel and the updated modules; and
transferring execution control to the system software kernel.

18. The computer system of claim 17, wherein the boot image is retrieved from an external source, and wherein the entire boot image is not reloaded into the system memory between start and completion of the reboot.

19. The computer system of claim 17, wherein the reboot operation further includes the step of:
after the updated modules of the boot image are loaded into the system memory, updating a data structure that tracks locations of the modules within the system memory to store new locations of the updated modules within the system memory,
wherein the second level boot loader accesses the data structure to locate the modules of the boot image during loading the modules of the boot image for execution.

20. The computer system of claim 19, wherein the reboot operation further includes the step of:
determining whether or not a module of the boot image has changed by comparing a hash or checksum of the module with a hash or checksum respectively of the corresponding module in the updated boot image.

* * * * *